United States Patent [19]
Cote et al.

[11] Patent Number: 5,873,306
[45] Date of Patent: Feb. 23, 1999

[54] SELF-COMPENSATING TENSIONER

[75] Inventors: Kevin Lauren Cote, Durham; Louis John Doucet, Salem, both of N.H.

[73] Assignees: Heidelberg Harris Inc., Dover, N.H.; Heidelberger DruckmashinenAG, Heidelberg, Germany

[21] Appl. No.: 834,520

[22] Filed: Apr. 4, 1997

[51] Int. Cl.⁶ ..................................................... B41F 13/54
[52] U.S. Cl. ........................... 101/228; 400/53; 400/618; 226/195
[58] Field of Search ..................................... 101/288, 228, 101/DIG. 31, 232; 400/234, 618, 53, 611, 613.3; 226/180, 189, 194, 195

[56] References Cited

U.S. PATENT DOCUMENTS

| | | | |
|---|---|---|---|
| 2,067,755 | 1/1937 | Dyer, Jr. .................................... | 225/195 |
| 4,014,491 | 3/1977 | Gref et al. ................................ | 226/195 |

*Primary Examiner*—Christopher A. Bennett
*Attorney, Agent, or Firm*—Kenyon & Kenyon

[57] ABSTRACT

A self-compensating tensioner, particularly a self-compensating tensioner for use in a folder of a web offset printing press, includes a plurality of rollers designed to tension tapes. Each roller is mounted on a tensioner arm. The tensioner arms are mounted on a rotatable shaft via one-way clutches with a weight attached to each tensioner arm so that the center of mass of the tensioner arm is offset from the rotatable shaft. The force of gravity may therefore rotate the tensioner arm about the shaft, applying a minimum tension to the tape through the roller. A lever arm is connected to the shaft through an engagement clutch, with an actuator connected to the lever arm. When the actuator and the engagement clutch are activated, the lever arm can apply a torque to the tensioner arms through the shaft, thereby increasing the tension in the tapes to a working level. When the engagement clutch is deactivated, the shaft may rotate freely, allowing each tensioner arm to be independently moved for tape installation and replacement and further allowing each tensioner arm to reach an equilibrium and thereby apply equivalent tensions to the tapes.

16 Claims, 3 Drawing Sheets

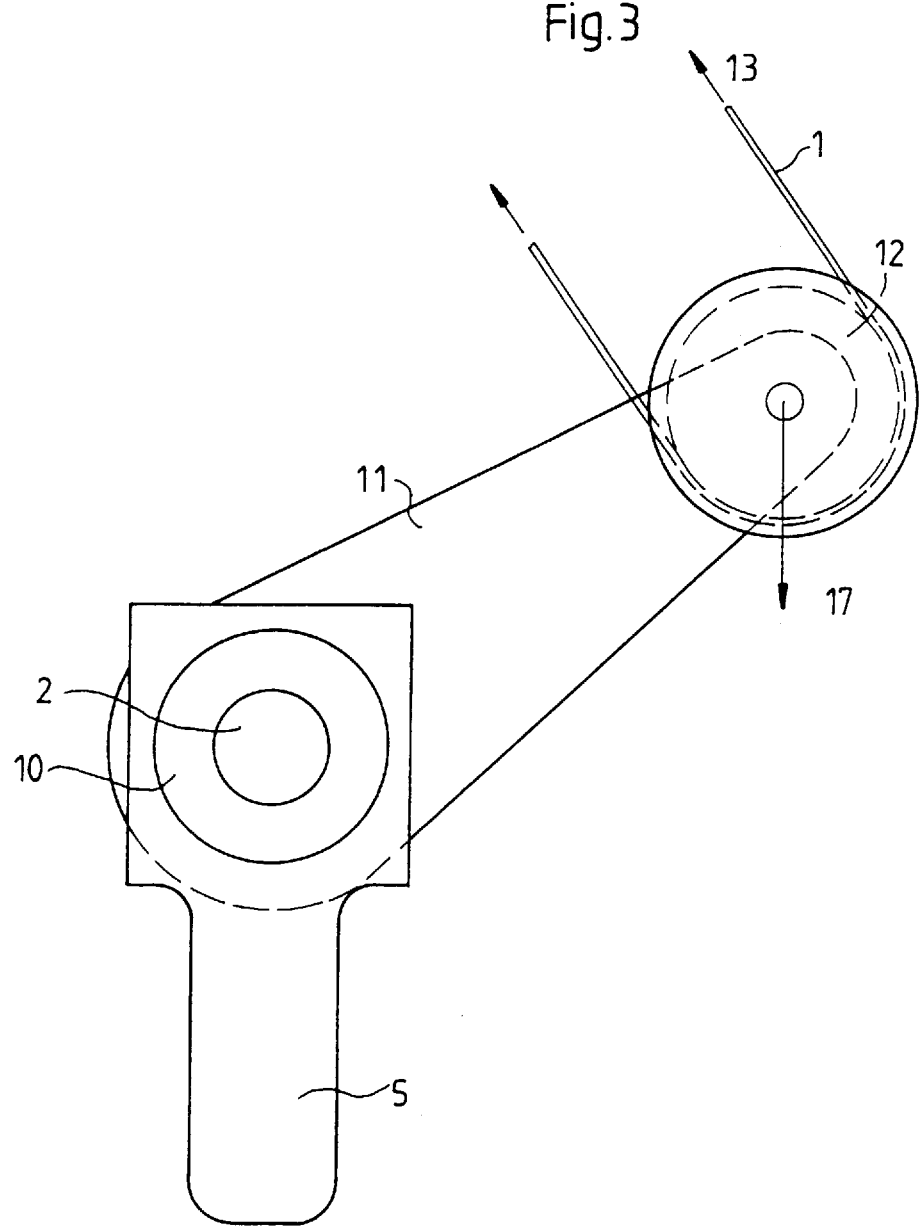

SELF-COMPENSATING TENSIONER

FIELD OF THE INVENTION

The present invention relates to an automatic tensioning system for multiple adjacent tapes, particularly multiple tapes located in a folder of a web offset printing press.

BACKGROUND INFORMATION

Multiple adjacent tapes are commonly found in folders used in printing presses such as web offset printing presses. Tensioning systems for multiple adjacent tapes require adjustment when the tapes are installed or replaced, or to periodically tension the tapes as they stretch. Generally, each of the multiple tapes is mounted on a roller connected to a tensioner arm and the tapes must each be under similar tensions. For example, when an individual tape breaks, the new tape must be installed and manually adjusted so that its tension is equivalent to the others. Even if tapes do not need to be replaced, normal expansion or stretching requires frequent adjustment to maintain constant tension in the tapes. Manual adjustment normally requires special tools to ensure that the tension is correct, is difficult to perform precisely, and is made more difficult due to limited mobility of the rollers which hold or support the tapes. Manual adjustment thus adds cost to the assembly, repair, or maintenance of the machine, and normal stretching of the tapes requires that the system be monitored and maintained to assure proper machine performance.

For example, in a conventional printing press folder, such as the Heidelberg Harris PFF-3 folder manufactured by Heidelberg Harris, Inc. of Dover, N. H., signatures traveling at relatively high speeds are accelerated, via a friction contact with multiple adjacent tapes of the folder, for delivery into a fan wheel or deceleration device. There the signature is slowed down and prepared for further processing. In such a conventional folder, a problem arises with tape changes as there is little room to work in the folder, thus necessitating movement of (e.g., raising up) for example, the lead-in rolls to facilitate tape changes. To compensate for the slack in the tapes created by raising up the lead-in rolls, generally tension is applied to the tapes by, for example, operating a pneumatically operated tensioner against all of the tapes.

In such a system, however, all of the tensioner arms are clamped to a common shaft and independent movement of the arms (such as, for example, to replace a particular, individual tape, to perform maintenance, or to clear a paper jam) is not possible without tools.

SUMMARY OF THE INVENTION

In accordance with the present invention, a self-compensating tensioner, particularly a self-compensating tensioner for use in a printing press folder includes a plurality of rollers designed to tension each tape, belt, band or other similar member of the folder (collectively referred to as "tapes"). Each roller is mounted, for example, on a tensioner arm. The tensioner arms are mounted on a rotatable shaft via one-way clutches, with a weight attached to each tensioner arm so that the center of mass of the tensioner arm is offset from the rotatable shaft. The force of gravity may therefore rotate the tensioner arm about the shaft, applying a minimum tension to the tape through the roller. A lever arm can be connected to the shaft through an engagement clutch, with an actuator connected to the lever arm, so that when the actuator and the engagement clutch are activated, the lever arm can apply a torque to the shaft. The one-way clutch transfers this torque to the tensioner arms, thereby increasing the tension in the tapes to a working level. When the engagement clutch is deactivated, the shaft may rotate freely, allowing each tensioner arm to reach an equilibrium and thereby apply similar tensions to the tapes.

Several advantages are obtained with the device according to the present invention. Because the tensioner arms are designed so that the force due to gravity keeps a minimum tension on the tapes, the tensioner arms may be used to automatically compensate for any discrepancies in tape tensions. If a new tape is installed or an old one replaced, the system according to the present invention automatically applies the same initial tension to the tape as is present in other tapes. Similarly, to correct any discrepancies caused by stretching of the tapes, the engagement clutch may be periodically deactivated to allow the tapes to reach a new equilibrium before reapplying working tension from the actuator. Because tensioning is achieved quickly and automatically, the device according to the present invention saves both time and money in installing tapes, replacing tapes, and maintaining similar tensions between tapes.

A further feature of the device according to the present invention is that the device allows full and independent movement of each tensioner arm. This freedom allows greater movement of the tape roller for installation and replacement of tapes. In addition, while one or more tensioner arms are moved, the device according to the present invention can maintain a minimum tension in the other tapes, thereby keeping the other tapes from falling off of the rollers. Consequently tape installation and replacement are further simplified.

A further feature of the device according to the present invention is that tape installation and replacement and maintenance of constant tensions in the tapes may be achieved without the use of special tools. Production and maintenance are thereby further simplified and made less expensive.

BRIEF DESCRIPTION OF THE DRAWINGS

FIG. 3 shows an embodiment of a self-compensating tensioner arm according to the present invention.

DETAILED DESCRIPTION OF THE INVENTION

Figure 1:
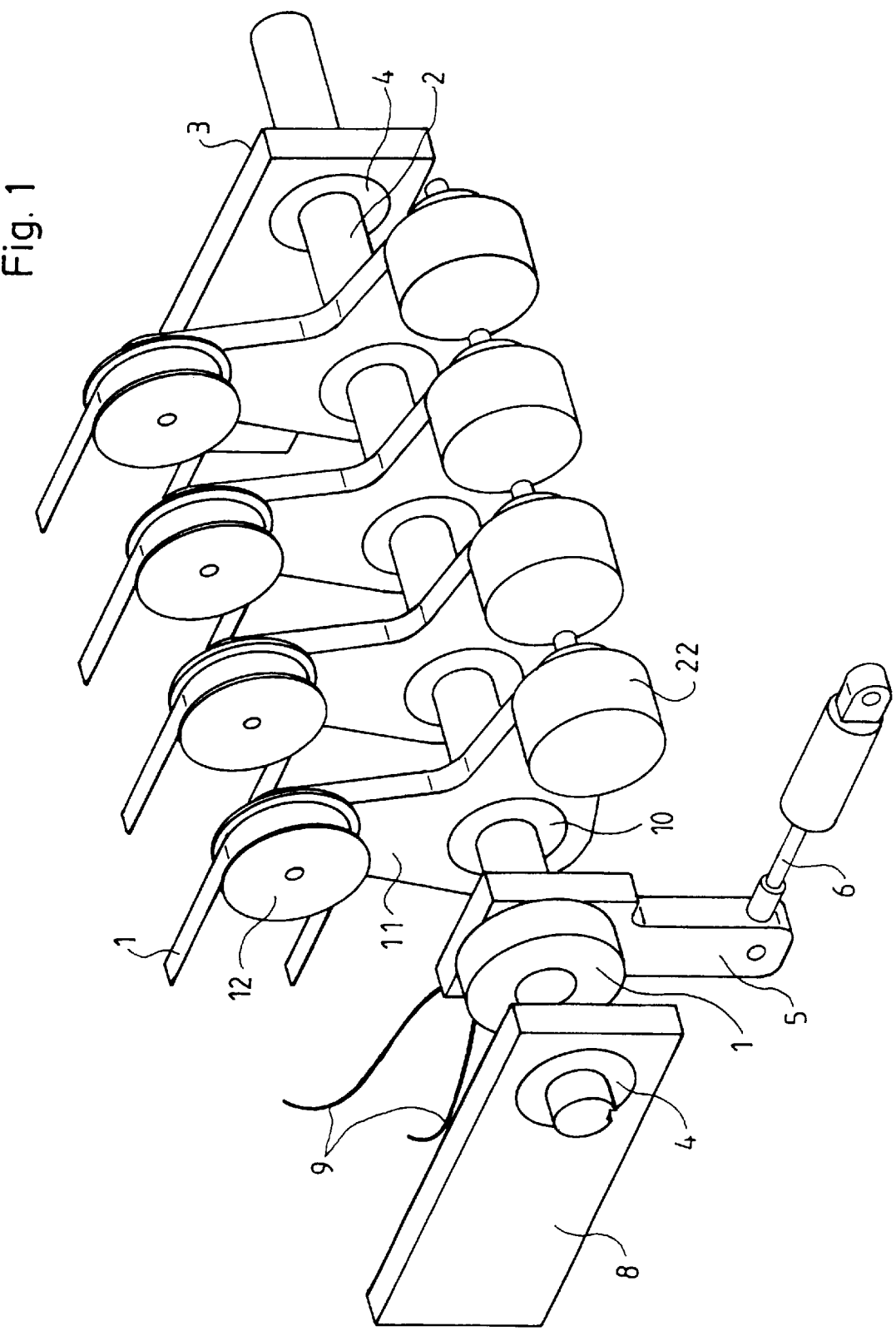
FIG. 1 shows a perspective view of a self-compensating tensioner according to the present invention.

FIG. 1 shows a plurality of tapes 1 being tensioned by respective rollers 12. The rollers 12 are attached, for example, to respective tensioner arms 11, and the tensioner arms 11 are mounted on a shaft 2 through respective one-way clutches 10. Each one-way clutch 10 is, for example, a conventional one-way clutch and can include, for example, a one-way clutch manufactured by The Torrington Company of Torrington, Connecticut. The shaft 2 may rotate freely in bearings 4, which are mounted, for example, in frames 3 and 8 of a folder. Referring to FIG. 1, the one-way clutches 10 allow rotation of the shaft 2 through the tensioner arms 11 in the counter-clockwise direction and allow, for example, rotation of the tensioner arms 11 around the shaft 2 in the clockwise direction. Alternatively, the one-way clutches 10 can allow the shaft 2 to apply torque to the tensioner arms 11 in the clockwise direction, and allow the tensioner arms 11 to apply torque to the shaft 2 in the counter-clockwise direction.

Lever arm 5 has a proximal end and a distal end. Engagement clutch 7 rigidly connects the proximal end of lever arm 5 to shaft 2 when the engagement clutch 7 is activated, for example, by signal 9. Signal 9 can be provided, for example, by a conventional printing press control system used to operate, for example, a conventional web offset lithographic printing press, or the signal 9 can be provided by a mechanical switch located at the folder or a mechanical clutch/ mechanical air pressure control assembly provided at the folder. When the engagement clutch 7 is deactivated, the shaft 2 may rotate freely inside of the engagement clutch 7. The distal end of lever arm 5 is attached, for example, to actuator 6. When activated, actuator 6 may push on the distal end of lever arm 5, applying torque to the shaft as described above.

Figure 2:
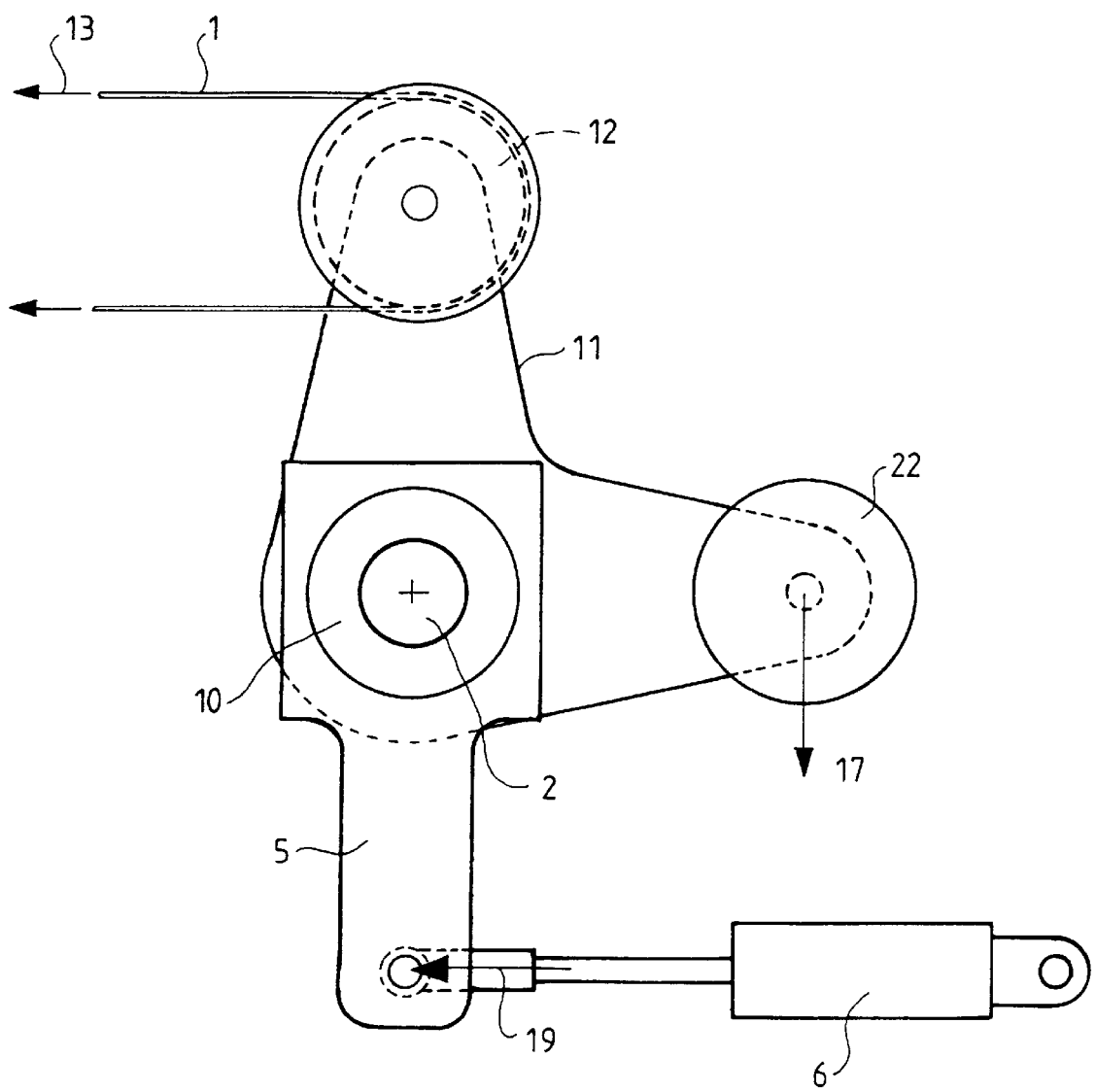
FIG. 2 is a side view of the self-compensating tensioner shown in FIG. 1, illustrating the forces involved.

FIG. 2 shows the force of gravity 17 applying a clockwise torque to tensioner arm 11 about shaft 2 according to the present invention. That torque is opposed, for example, by the counter-clockwise torque applied to the tensioner arm 11 by tension 13 in the tape via roller 12. When engagement clutch 7 is activated, for example, actuator 6 may apply actuator force 19, creating an additional clockwise torque on the tensioner arm 11 through the lever arm 5, the shaft 2, and one-way clutch 10. The additional torque created by actuator force 19 rotates the tensioner arm 11 clockwise, increasing the tension 13 in the tape 1 to a working level.

As shown in FIGS. 1 and 2, tensioner arms 11 are designed so that the force of gravity 17 can apply a torque to each tensioner arm 11, causing it to rotate clockwise about the shaft 2 unless acted upon by another force. For example, a weight 22 may be rigidly attached to the tensioner arm 11 so that, with reference to FIG. 1, the center of mass of the tensioner arm 11 is on the right side of the shaft 2. Alternatively, the weight 22, for example, may be movably attached to the tensioner arm 11 via a shoulder, so that, with reference to FIG. 1, the center of mass of the tensioner arm 11 and weight 22 combined is on the right side of the shaft 2 and the value of the weight 22 can be varied. In an alternative embodiment of the present invention shown in FIG. 3, instead of the weight 22, the roller 12 and/or the tensioner arm 11 can act as the counterweight. For example, the center of mass of the roller 12 and/or tensioner arm 11 can be above and offset to the right of the shaft 2, so that the weight of the roller 12 and/or tensioner arm 11 provides an initial torque and minimum tension via the force of gravity 17.

With the device according to the present invention, when the engagement clutch 7 is deactivated, the force of gravity 17 will create similar tensions 13 in tapes 1. For example, referring to FIG. 1, force of gravity 17 applies a clockwise torque to the tensioner arm 11, causing the tensioner arm 11 to rotate clockwise around the shaft 2, thereby stretching tape 1. As the tape 1 stretches, it will apply an increasing torque to the tensioner arm 11 through the roller 12. Eventually, the tensioner arm 11 will reach an equilibrium position in which the tension in the tape 1 applies torque on the tensioner arm 11 equal to the torque applied by the force of gravity 17. Because the torques applied by the force of gravity 17 on the tensioner arms 11 are identical, the tensions in the tapes 1 will be identical as well. The force of gravity 17 has a similar effect in the embodiments of the present invention shown in FIGS. 2 and 3 as well.

Once the tensioner arms 11 reach equilibrium, thereby applying similar tensions to the tapes 1, the engagement clutch 7 can be activated by signal 9 and the actuator 6 may apply force to the distal end of lever arm 5. This force will create a clockwise torque in the shaft 2 via the engagement clutch 7. The torque will cause the shaft 2 to rotate in the clockwise direction, which in turn will force the tensioner arms 11 to rotate via the one-way clutches 10. This rotation will further stretch the tapes 1, applying a working tension, in which all tape tensions 13 are similar, for normal operation of the tape system.

With the device according to the present invention, installation or replacement of tapes is simplified. When a tape 1 breaks, for example, the actuator 6 can be relaxed and the engagement clutch 7 deactivated. At this point, the shaft 2 may rotate freely within the engagement clutch 7. The tensioner arm 11 corresponding to the broken tape may be rotated counter-clockwise, thereby creating slack in the broken tape and allowing easy removal. As the tensioner arm 11 is rotated counter-clockwise, it forces the shaft 2, via the one-way clutch 10, to rotate counter-clockwise as well. However, because the shaft 2 may rotate freely through the other one-way clutches in the counter-clockwise direction, the other tensioner arms 11 may remain in their equilibrium positions. As a result, the other tapes 1 will remain at a minimum tension and will not fall off the respective rollers 12. Once the broken tape is replaced, the tensioner arm 11 may freely rotate clockwise back around the shaft 2, tensioning the new tape until it reaches its equilibrium position. At this point all tapes 1 have similar tensions. The engagement clutch 7 and the actuator 6 can then be activated, for example, applying a working tension to the tape system in which all tape tensions 13 are similar.

Similarly, the tensioner according to the present invention may be used to maintain similar tensions in tapes 1 as the tapes stretch or relax. Periodically, the engagement clutch 7 and actuator 6 can be deactivated. Because of differences in length or elasticity which develop during normal use, the tensions 13 in the tapes 1 may not at this point be equal. As a result, the tapes will not apply equivalent torques on tensioner arms 11 sufficient to oppose the torques applied by the force of gravity. Each tensioner arm 11 may therefore rotate clockwise around shaft 2, increasing the tension in the corresponding tape 1 until the torque applied by the tape is equal to the torque applied by the force of gravity. When all tensioner arms 11 reach their respective equilibrium positions, the tensions 13 in the tapes will be identical. At this point, the engagement clutch 7 and actuator 6 may be activated, applying a working tension to the tape system in which all tape tensions 13 are similar.

What is claimed is:

1. A self-compensating tensioner assembly, comprising:
   at least one tape;
   at least one roller;
   a tensioner arm having a first portion and a second portion, the first portion releasably engaging the at least one tape via the at least one roller and the second portion creating a downward force to rotate the tensioner arm, thereby creating a tension in the at least one tape;
   a shaft, the tensioner arm being mounted on the shaft; and
   a one-way clutch disposed within the tensioner arm, the one-way clutch allowing rotation of the tensioner arm about the shaft to an equilibrium position in which a torque applied to the tensioner arm by the tension in the at least one tape equals a torque applied to the tensioner arm by the downward force.

2. The self-compensating tensioner assembly of claim 1, wherein the second portion of the tensioner arm includes a weight rigidly attached to the tensioner arm.

3. The self-compensating tensioner assembly of claim 1, wherein the second portion of the tensioner arm includes a weight releasably disposed on the tensioner arm via a shoulder.

4. A self-compensating tensioner assembly, comprising:
a frame;
a shaft rotatably disposed in the frame;
at least one tape;
at least one roller;
a one-way clutch; and
a tensioner arm having a first portion and a second portion, the tensioner arm movably disposed on the shaft via the one-way clutch, the first portion releasably engaging the at least one tape via the at least one roller and the second portion creating a downward gravitational force to rotate the tensioner arm, thereby creating a tension in the at least one tape.

5. The self-compensating tensioner assembly of claim 4, wherein the second portion of the tensioner arm includes a weight rigidly attached to the tensioner arm.

6. The self-compensating tensioner assembly of claim 4, wherein the second portion of the tensioner arm includes a weight releasably disposed on the tensioner arm via a shoulder.

7. The self-compensating tensioner assembly of claim 4, further comprising:
an engagement clutch, having an activated state and a deactivated state, connected to the shaft so that when the engagement clutch is in the activated state the shaft is rigidly connected to the engagement clutch, and when the engagement clutch is in the deactivated state the shaft may freely rotate within the engagement clutch;
a lever arm, having a distal end and a proximal end, the proximal end rigidly connected to the engagement clutch; and
an actuator, having an activated state and a deactivated state, rigidly connected to the distal end of the lever arm, so that when the actuator is in the activated state the actuator applies a force to the lever arm, and when the actuator is in the deactivated state, the actuator does not apply force to the lever arm.

8. The self-compensating tensioner assembly of claim 7, wherein the second portion of the tensioner arm includes a weight rigidly attached to the tensioner arm.

9. The self-compensating tensioner assembly of claim 7, wherein the second portion of the tensioner arm includes a weight releasably disposed on the tensioner arm via a shoulder.

10. A self-compensating tensioner assembly, comprising:
a frame;
a shaft rotatably disposed in the frame;
a plurality of tapes;
a plurality of rollers;
a one-way clutch; and
a plurality of tensioner arms, each of the plurality of tensioner arms having a first portion and a second portion and being movably disposed on the shaft via the one-way clutch, the first portion of each tensioner arm releasably engaging the plurality of tapes via the plurality of rollers and the second portion of each tensioner arm creating a downward force to rotate the tensioner arm, thereby creating a tension in the plurality of tapes.

11. The self-compensating tensioner assembly of claim 10, wherein the second portion of the tensioner arm includes a weight rigidly attached to the tensioner arm.

12. The self-compensating tensioner assembly of claim 10, wherein the second portion of the tensioner arm includes a weight releasably disposed on the tensioner arm via a shoulder.

13. The self-compensating tensioner assembly of claim 10, further comprising:
an engagement clutch, having an activated state and a deactivated state, connected to the shaft so that when the engagement clutch is in the activated state the shaft is rigidly connected to the engagement clutch, and when the engagement clutch is in the deactivated state the shaft may freely rotate within the engagement clutch;
a lever arm, having a distal end and a proximal end, the proximal end rigidly connected to the engagement clutch; and
an actuator, having an activated state and a deactivated state, rigidly connected to the distal end of the lever arm, so that when the actuator is in the activated state the actuator applies a force to the lever arm, and when the actuator is in the deactivated state, the actuator does not apply force to the lever arm.

14. A self-compensating tensioner assembly, comprising:
at least one tape;
a tensioner arm releasably engaging the at least one tape, the tensioner arm creating a downward force to rotate the tensioner arm, thereby creating a tension in the at least one tape;
a shaft, the tensioner arm being mounted on the shaft; and
a one-way clutch disposed within the tensioner arm, the one-way clutch allowing rotation of the tensioner arm about the shaft to an equilibrium position in which a torque applied to the tensioner arm by the tension in the at least one tape equals a torque applied to the tensioner arm by the downward force.

15. The self-compensating tensioner according to claim 14, wherein the downward force is created as a function of a weight of the tensioner arm.

16. The self-compensating tensioner according to claim 14, further comprising:
at least one roller, wherein the tensioner arm engages the at least one tape via the at least one roller and the downward force is created as a function of a weight of the tensioner arm and the at least one roller.

\* \* \* \* \*